INVENTOR.
Vernon J. Lundell
ATTORNEY

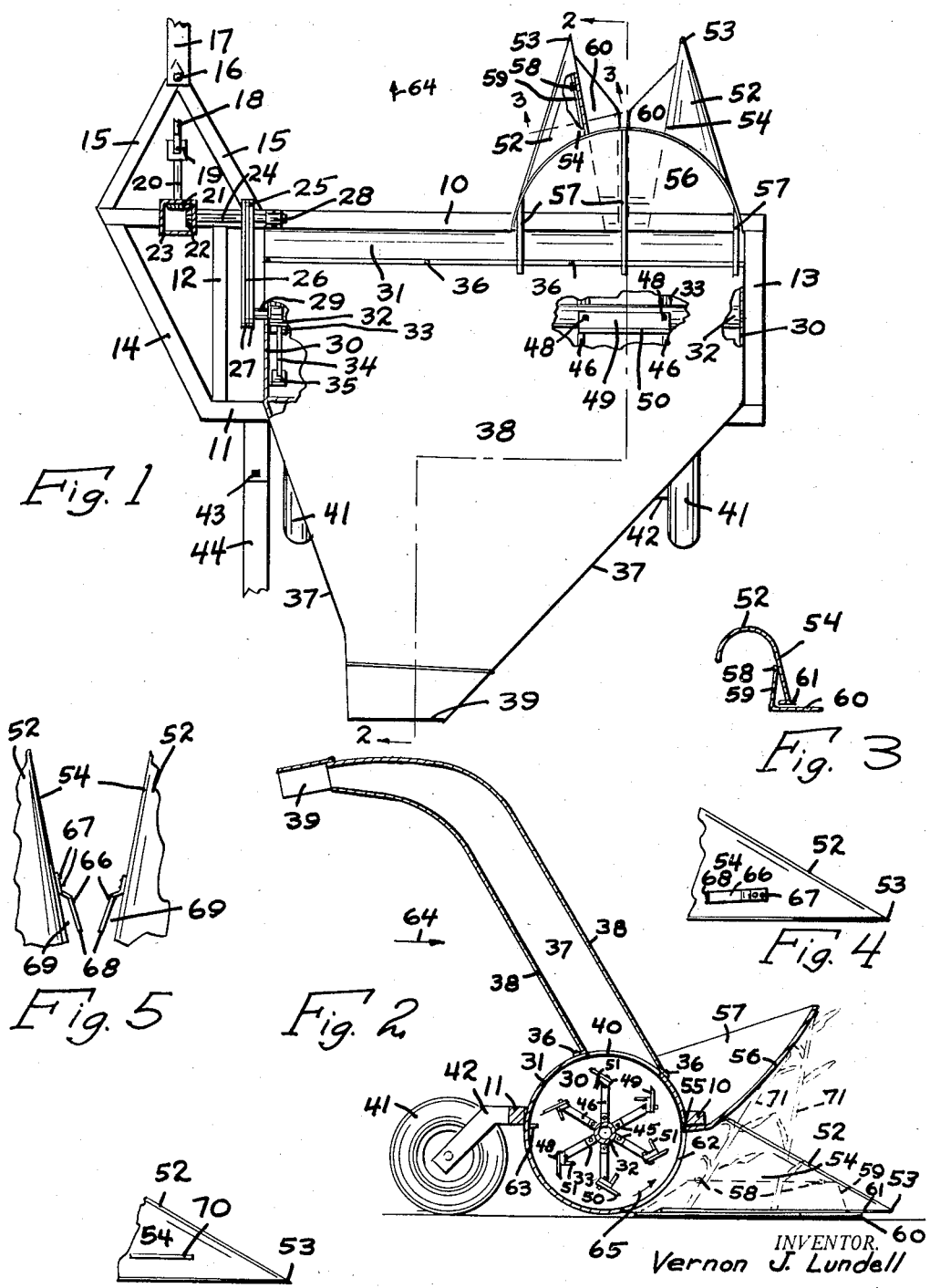

United States Patent Office 2,888,795
Patented June 2, 1959

2,888,795
CORN CHOPPER
Vernon J. Lundell, Cherokee, Iowa
Application December 29, 1955, Serial No. 556,147
4 Claims. (Cl. 56—23)

My invention relates to a corn chopper.

An object of my invention is to provide a device which includes the combination of an ensilage and corn cutter as well.

A further object of my invention is to provide a chopping device which will pass along a row of row crop whereby the corn stalks will be efficiently gathered into the casing of the device and then chopped, the cut stalks thence being drawn upwardly and outwardly through a chute which will then discharge the cut material into a wagon or other receptacle accompanying the chopper.

A further and important object of my invention is to provide a special angularly positioned baffle or plate element which will provide means whereby the stalks entering into the machine will be gradually bent instead of being abruptly bent for the purposes to be explained later.

A further object of my invention is to provide a pair of gravity or spring urged horizontally positioned members which are carried beneath the snouts or aprons of the device to allow the stalks to enter and yet to provide a catching element.

A further object of my invention is to provide a special blade structure which will efficiently cut the stalks and will also include features whereby the cut material is entrapped in suitable pockets during the cutting operation.

A further object of my invention is to provide means for deflecting the downwardly bent stalks by means of suitable bars or other elements as the stalks enter the machine.

A further object of my invention is to provide a chopper which will gather hay from the field and whereby the same device will also chop the hay for the necessary feed or other purposes.

A further object of my invention is to provide such a device in a simple construction, and wherein the hay or other crop is efficiently chopped up and thence conveyed from the machine in a horizontally positioned conveyor to any necessary receptacle such as a wagon or the like, and to provide special types of conveyors for this purpose.

Figure 7:
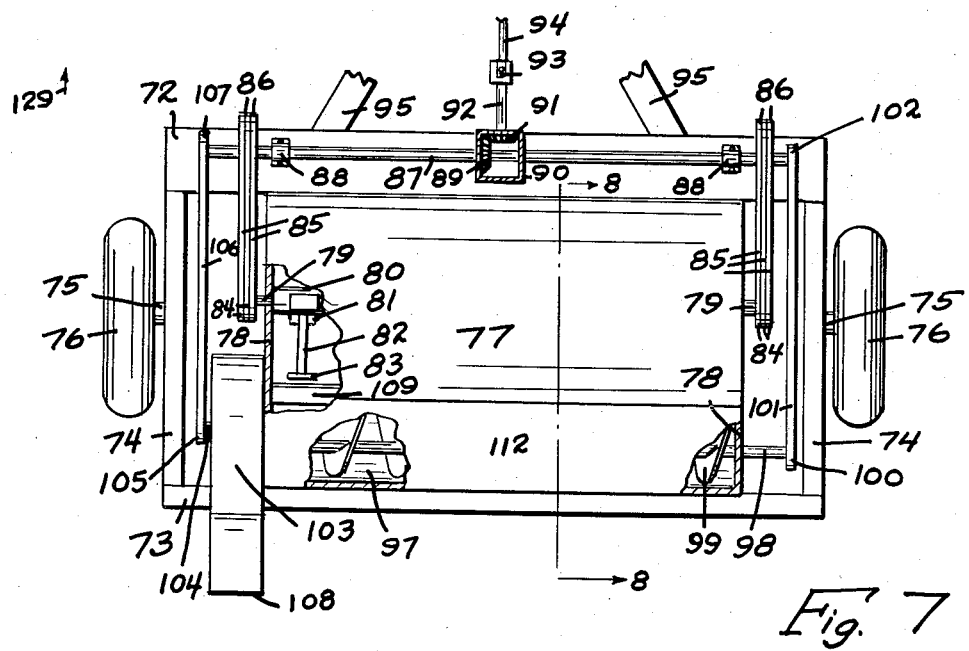
Figure 8:
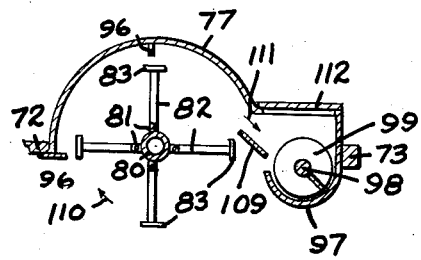
Figure 10:
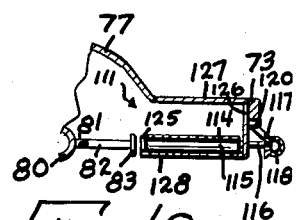
Figure 9:
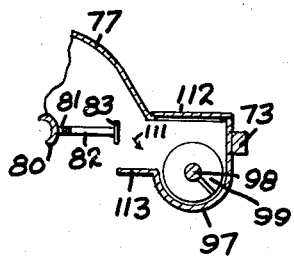
Figure 11:
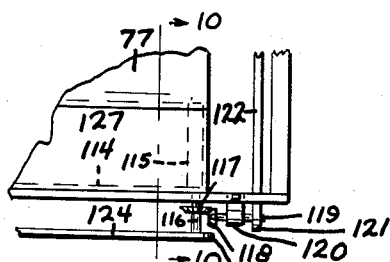

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

Figure 1 is a plan view of the ensilage and corn stalk cutter arrangement with certain fragmentary sections, Figure 2 is a sectional view of Figure 1 taken along the lines 2—2 thereof, Figure 3 is a sectional view of Figure 1 taken along the lines 3—3 thereof, Figure 4 is a side elevation of a modification, Figure 5 is a plan view of the modification shown in Figure 4, Figure 6 is a further modification, Figure 7 is a plan view of a modified form of hay chopper, Figure 8 is a sectional view of Figure 7 taken substantially along the lines 8—8 thereof, Figure 9 is a modification, Figure 10 is a further modification taken along the lines 10—10 of Figure 11, and Figure 11 is a plan view of Figure 10.

My invention contemplates the provision of a chopping device which will especially accommodate standing corn and which provides an important advantage wherein the corn stalks are slowly bent as they pass into the chopping device, and so the undesirable feature of corn stalks being bent or snapped suddenly is eliminated, my invention further contemplating a hay chopping structure having special conveyor features.

I have used the characters 10 and 11 to indicate bracing or support members, the characters 12 and 13 indicating forwardly positioned braces, the character 14 indicating an angular brace, the character 15 indicating further straps or braces to which is attached at 16 a forwardly positioned tongue or a similar member 17 which is attached to a tractor which draws the entire arrangement.

The character 18 indicates a shaft connection passing to the rear power take-off drive of the tractor, which shaft 18 is attached to a universal joint 19 which in turn is attached to the shaft 20 which is attached to the bevel gear 21 which meshes with the further bevel gear 22, these bevel gears being housed in the housing 23, the housing 23 being suitably supported on the continuing portion of the brace 10.

Attached to the bevel gear 22 is the shaft 24 to which are attached suitable pulleys 25 over which pass the belts 26 which engage further smaller pulleys 27, the shaft 24 being journalled at 28.

The pulleys 27 are attached to a further shaft 29 which is journalled within the side walls 30 of a cylindrical casing 31, and attached to the shaft 29 is the hollow pipe 32. Attached to the pipe 32 are the various ears 33 to which are pivoted the bars 34 terminating in the cup-shaped blades 35 which extend laterally throughout a portion of the casing 31 and practically up to the further blade structure which will be described later.

Secured at 36 to the casing 31 is an upwardly extending chute having side walls 37, further walls 38, and a discharge opening at 39, the bottom end of this chute communicating to an opening 40 provided at the top of the casing 31 and as shown clearly in Figure 2.

The arrangement is partially supported on the wheels 41 which are journalled to the brackets 42 which are attached to the brace members 11 as shown, and the arrangement is connected at 43 to the tongue 44 of a wagon or other vehicle into which the resulting chopped material is to be ejected.

Also attached to the pipe 32 (see Figure 2) are similar ears 33 to which are pivotally attached at 45 the further bars 46 which bars terminate in the angularly inclined portions 47 to which are bolted at 48 the blades 49 having the sharpened edges 50, and welded or otherwise attached to the members 47 are the straps 51 which are practically at right angles to the blades 49 and which straps 51 are as long as the blades, the length of the blades 49 being shown in Figure 1.

Attached to the walls of the casing 31 are a pair of forwardly extending aprons 52 terminating in the points 53, these aprons being shaped approximately as shown in Figure 3, and having the forwardly diverging sloping side walls 54. Attached at 55 to the casing wall 31 is the upwardly and forwardly extending plate 56 which is substantially circular as is more readily seen from Figure 1.

It should be understood that this plate can extend in a straight line or slightly curved as shown consistent with the general objectives that the plate will provide, the character 57 indicating various braces for supporting the plate, which braces are attached to the plate and to the chute or casing walls.

Hinged at 58 inwardly of the walls 54 of the aprons 52 are the downwardly projecting members 59 which bend into the horizontally positioned plates 60 which normally are positioned just beneath the runners 61 of the aprons (see Figure 3), there being a plate 60 therefore at either side and pivotally attached to either apron. The aprons 52 communicate to the casing through an opening 62 which is cut-out of the casing wall, it thus being noted that any stalks passing through the aprons will enter through the opening 62 and will be thoroughly chopped by the blades 49, with suitable radially positioned bars 63 being secured to the casing 31 to assist in the chopping action, it being understood that more than one bar can be provided if desired.

The operation of the device is as follows. As the machine travels in the direction of the arrow 64 (see Figures 1 and 2) the various blades 35 as well as the blades 49 will be impelled in a rotary manner in the direction of the arrow 63 (see Figure 2), the blades 35 serving the purpose of increasing the suction or draft to throw the discharged material out of the opening 39, the blades 49, however, serving to cut the corn stalks at the ground level and to thoroughly chop up these corn stalks due to the action of these blades against the bars 63, the resulting material of which is thence carried upwardly through the chute and discharged through the opening 39.

During the passage of the corn stalks between the aprons 52, these stalks will pass between the flat plates 60 which plates are held by gravity to the lower position so that the corn stalks entering between the plates will enter centrally and in a uniform manner, since these plates naturally can pivot outwardly to accommodate various sizes or thicknesses of the corn stalk crop, the plates thereby serving to receive any material as the stalks are bent downwardly which may fall off of the stalks and thence be transferred to the chopping blades, and it should be specifically understood also that the member 59, besides being gravity operated, could include suitable equivalents to provide the same result.

Figures 5 and 6 show a further modification whereby the entering crop can also be entrapped and carried into the blades, Figure 5 illustrating a modification wherein the spring blades 66 are used, which are attached at 67 within the aprons 52 and on the sloping surfaces 54, it being noted that the terminals 68 of the blades will concentrate and centralize the stalks as they enter the machine, Figure 5 being a plan view, and any stalks which may not pass directly inwardly will be entrapped in the spaces 69 and thence transferred into the cutting blades due to the forward motion of the unit.

Figure 4 illustrates a side elevation of one of the blades 66, and Figure 6 illustrates a further modification wherein a straight bar 70 is used which extends outwardly from the sides 54 which bar will catch material which may drop onto the same.

The upwardly inclined plate 56 provides a very important function in the present machine in that it gradually regulates the bending action of the corn stalks as illustrated by the dotted lines character 71, wherein this character designates the stalks, and it will be noted that as the machine travels in the direction of the arrow 64, during successive positions of travel, the stalks due to the inclined plate 56, will be very gradually bent over as will be clearly obvious, so that there will not be an abrupt shock to the stalk at one point, which would tend to completely loosen ears and the like from the stalk, which would fall to the ground and would not pass within the machine, the present inclined structure, however, serving to bend the stalks only gradually as explained above to eliminate the abrupt breakage or the above mentioned waste of material, it being understood also that certain of the structures mentioned could be used with this arrangement if desired.

It will be noted that during rotary motion of the blades 49 (see Figure 2) the transverse plates 51 will provide a pocket between these plates and the blades 49 which can be readily observed from the right-hand of Figure 2, which pocket therefore receives the cut material and thence throws it directly upwardly through the chute 37, 38 and out of the opening 39, thereby providing an added feature for impelling the material upwardly and outwardly.

Figures 7 to 11 inclusive illustrate further forms of my invention of a hay chopper set forth in my co-pending continuation-in-part application, Serial No. 433,336, filed June 1, 1954, and allowed December 2, 1955, now Patent Number 2,758,435, issued August 14, 1956 which further forms or modifications pertain principally to the conveyor structures used in connection with such devices, this invention pertaining principally to a hay chopper which will gather hay from the field, which same device will chop the hay for the necessary feed or other purpose, and wherein the chopped material is conveyed directly in the machine to the necessary discharge point.

In this device I have used the characters 72 and 73 to indicate framework portions, the character 74 indicating side framework portions to which are attached the stub shafts 75 upon which are journalled the wheels 76.

Attached between the framework portions is a downwardly facing semi-cylindrical casing 77 having side walls 78 in which are journalled the shafts 79 which are secured to the transverse pipe 80 to which pipe are attached the ears 81 to which ears are pivotally attached the swinging bars 82 terminating in the chopping hammers 83 which can be of any desired shape, and attached to the shafts 79 are the pulleys 84 over which pulleys pass the belts 85 which engage the larger pulleys 86 which are attached to a transverse shaft 87 journalled at 88, the transverse shaft 87 being driven by means of the bevel gear 89 within the casing 90, which bevel gear 89 is driven by means of a further bevel gear 91 attached to the shaft 92 which is attached to the universal joint 93 which is attached to the shaft 94 which passes to the rear power take-off shaft of the tractor which draws the arrangement, the character 95 indicating braces, which pass forwardly and are suitably secured to the tractor drawbar.

The character 96 indicates a cutting bar which passes laterally and there can be several of such cutting bars if desired, the cutting bars cooperating with the hammers 83 to cut the crop as explained in my aforesaid co-pending continuation-in-part application.

Positioned at one side of the casing 77 is a conveyor chute 97 in which is journalled the shaft 98 to which is attached the helical conveyor member 99, the shaft 98 being attached to a pulley 100 which engages a belt 101 which passes over a further pulley 102 which is driven by the shaft 87, and mounted at the other end of the conveyor is a blower unit 103 which is driven by means of the shaft 104 which is attached to the further pulley 105 which engages the belt 106 which passes over the pulley 107 which is also attached to the shaft 87, the blower 103 including a suitable opening registering with the helical conveyor, this conveyor being adapted to convey the feed toward the blower which then blows it out of the upper opening 108.

Suitably attached to the side walls 78 is a lengthened transversely mounted angularly positioned baffle plate 109. The direction of rotation of the hammers is in the direction of the arrow 110. As these hammers rotate and chop up the material, it will be impelled in the direction of the arrow 111 between the baffle plate 109 and the upper casing portions 112, and thence directly into the conveyor structure wherein the material will be carried to the blower 103 etc.

A further modification is shown in Figure 9 wherein identical characters will indicate identical parts, however, in this structure the chute 97 terminates in a substantially horizontal flange portion 113 which will also catch the material so that it will fall into the conveyor structure.

Figures 10 and 11 illustrate a still further modification wherein the character 114 indicates a continuous belt passing over the rollers 115, the belt being driven by means of the shaft 116 which is attached to the bevel gear 117 which meshes with the further bevel gear 118 which is attached to the shaft 119 which is journalled in the bearing 120, the shaft 119 being attached to the pulley 121 over which passes the belt 122 which belt will pass over a suitable pulley attached to the shaft 87, and also attached to the shaft 116 is a further pulley 123 over which passes the belt 124 which passes to the other roller 115 at the forward end of the chute, the conveyor unit thus driven serving to convey the material to any desired location such as to the blower 103, etc.

The shaft 116 can be journalled in the small bearings 125 and in the vertical wall 126 of the housing structure including the portions 127 and 128, it being noted from this structure also that the material will be delivered directly to the conveying belt. The character 129 indicates the direction of travel of the unit.

It will now be seen that I have provided the advantages mentioned in the objects of my invention with various other advantages being readily apparent.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. In a chopping device, a framework, a substantially cylindrical laterally positioned casing attached to said framework, a laterally positioned shaft mounted in said casing, a discharge chute communicating with the top of said casing, said casing including a forward opening for receiving stalks therein as said casing travels forwardly, forwardly extending aprons attached at either side of said forward opening for receiving stalks therebetween, a stalk bending plate-like member extending upwardly and forwardly from said casing opening to provide means whereby said stalks will gradually contact said plate-like member at progressively rearward and downward points as said stalks enter said chopping device.

2. In a chopping device, a framework, a casing attached to said framework, a chopping member journalled in said casing and rotatable therein, said casing having a forward opening, a stalk bending plate-like member extending upwardly and forwardly from said casing opening to provide means whereby said stalks will gradually contact said plate-like member at progressively rearward and downward points as said stalks enter said chopping device.

3. In a chopping device, a framework, a substantially cylindrical laterally positioned casing attached to said framework, a chopping member journalled in said casing, said casing having a forward opening, forwardly extending aprons attached at either side of said opening for receiving stalks therebetween, a pair of horizontally positioned plate members mounted on said aprons and laterally yieldable to provide a biased means for drawing said plates together as corn stalks pass therebetween.

4. In a chopping device, a framework, a substantially cylindrical laterally positioned casing attached to said framework, a laterally positioned shaft mounted in said casing, a discharge chute communicating with the top of said casing, said casing including a forward opening for receiving stalks therein as said casing travels forwardly, forwardly extending aprons attached at either side of said forward opening for receiving stalks therebetween, a stalk bending plate-like member extending upwardly and forwardly from said casing opening to provide means whereby said stalks will gradually contact said plate-like member at progressively rearward and downward points, as said stalks enter said chopping device, spring-urged abutment members attached to said aprons to provide spring-biased means for forcing said abutment members together as corn stalks pass therebetween.

References Cited in the file of this patent
UNITED STATES PATENTS

| | | |
|---|---|---|
| 1,800,058 | Dugger | Apr. 7, 1931 |
| 2,314,773 | Dahlman | Mar. 23, 1943 |
| 2,496,493 | Raney | Feb. 7, 1950 |
| 2,629,978 | Krause et al. | Mar. 3, 1953 |
| 2,636,329 | Everett et al. | Apr. 28, 1953 |
| 2,659,188 | Haban | Nov. 17, 1953 |
| 2,674,081 | Hansen | Apr. 6, 1954 |
| 2,713,240 | West | July 19, 1955 |